(12) United States Patent
Rowitch

(10) Patent No.: US 6,378,099 B1
(45) Date of Patent: Apr. 23, 2002

(54) BLIND FRAME IDENTIFICATION IN A COMMUNICATION SYSTEM

(75) Inventor: Douglas Neal Rowitch, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/239,561

(22) Filed: Jan. 29, 1999

(51) Int. Cl.[7] .............................................. H03M 1/16
(52) U.S. Cl. ...................................... 714/748; 714/749
(58) Field of Search ................................ 714/748, 749

(56) References Cited

U.S. PATENT DOCUMENTS

| | | | | |
|---|---|---|---|---|
| 5,239,557 A | * | 8/1993 | Dent .............................. | 375/1 |
| 5,384,565 A | * | 1/1995 | Cannon ................... | 340/825.44 |
| 5,664,091 A | | 9/1997 | Keen ....................... | 395/182.16 |
| 5,715,257 A | * | 2/1998 | Matsuki et al. ............... | 371/32 |
| 5,794,124 A | * | 8/1998 | Ito et al. ..................... | 455/38.3 |
| 5,881,069 A | * | 3/1999 | Cannon et al. .............. | 371/32 |
| 5,926,109 A | * | 7/1999 | Narusawa .............. | 340/825.44 |
| 5,970,391 A | * | 10/1999 | Eaton et al. ................. | 455/59 |

FOREIGN PATENT DOCUMENTS

EP 0866579 9/1998

OTHER PUBLICATIONS

"Code Combining—A Maximum Liklihood Decoding Approach for Combining An Arbitrary Number of Noisy Packets", David Chase, IEEE Transactions on Comm., vol. 33 No. 5, May 1985, pp. 385–393.

* cited by examiner

Primary Examiner—Stephen M. Baker
(74) Attorney, Agent, or Firm—Philip Wadsworth; Charles D. Brown; Bruce W. Greenhaus

(57) ABSTRACT

The present invention is a novel and improved method and apparatus for performing frame identification. In accordance with one embodiment of the invention, a received frame of data is processed by generating estimates of the received frame, measuring a correlation between said estimates and stored estimates of a previously improperly received frame, processing the received frame as a retransmitted frame when said correlation is greater than a first threshold, processing the received frame as a new frame when said correlation is less than a second threshold, wherein said second threshold is less than or equal to said first threshold.

11 Claims, 5 Drawing Sheets

BLIND FRAME IDENTIFICATION IN A COMMUNICATION SYSTEM

BACKGROUND OF THE INVENTION

I. Field of the Invention

The present invention relates to communications. More particularly, the present invention relates to frame identification.

II. Description of the Related Art

Communication systems that use data retransmission to correct errors are known. Typically, such communication systems transmit data in frames that include frame numbers. At a receive system, when a frame is received with an error, a negative acknowledgement (NACK) is transmitted back to a transmit system. The NACK may contain the frame number of the improperly received frame. The transmit system responds by retransmitting the frame at some later time. A frame may be retransmitted multiple times in some systems, until proper reception is achieved. The present invention is directed to performing frame identification, with particular emphasis on improving the performance of a communication system that uses retransmission techniques.

SUMMARY OF THE INVENTION

The present invention is a novel and improved method and apparatus for performing frame identification. In accordance with one embodiment of the invention, a received frame of data is processed by generating estimates of the received frame, measuring a correlation between said estimates and stored estimates of a previously improperly received frame, processing the received frame as a retransmitted frame when said correlation is greater than a first threshold, processing the received frame as a new frame when said correlation is less than a second threshold, wherein said second threshold is less than or equal to said first threshold.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is a novel and improved system for performing frame identification with application to a retransmit communication system. The system is described in the context of a wireless communication system. Such systems include cellular or other terrestrial wireless communication system and satellite based wireless communication systems. Also, the invention may be incorporated into wireline communication systems as well, although the invention provides the most utility in systems with fairly high transmission error rates.

The various systems and devices described throughout the application may be implemented via electronic circuits or microprocessors controlled by software stored in memory or some combination thereof. Other methods of implementing the invention will be apparent to one skilled in the art. The various blocks used to illustrate the invention may represent hardware or method steps.

Figure 1:
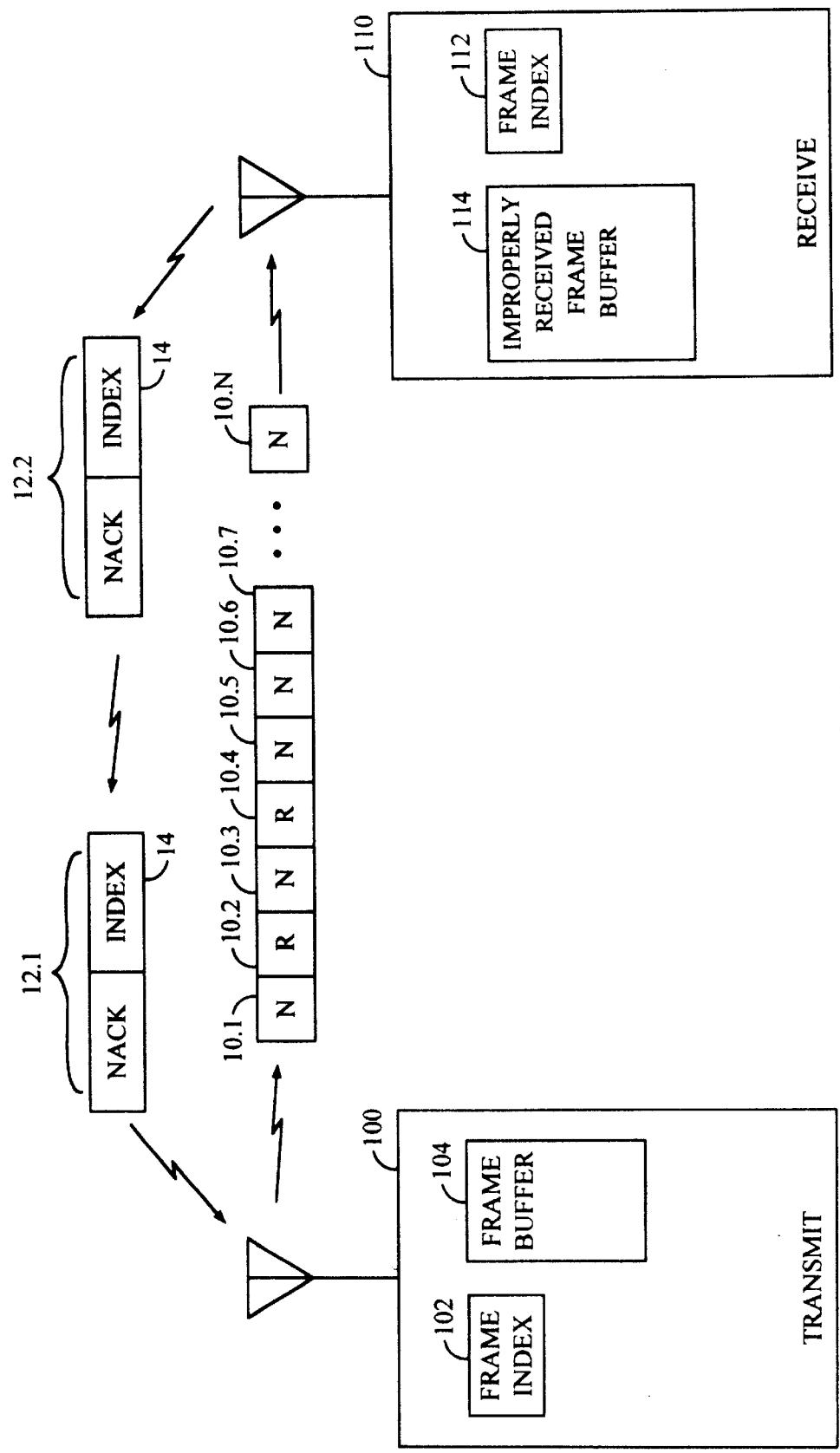
FIG. 1 is a block diagram of a communication system configured in accordance with one embodiment of the invention.

FIG. 1 is a block diagram of a simple wireless transmit system configured in accordance with one embodiment of the invention. Transmit system 100 sends data frames 10.1–10.N, and maintains an internal count of the frames sent using internal frame index register 102. That is, for each frame 10, transmitted frame index register 102 is incremented. Additionally, transmit system 100 stores a set of transmitted frames within frame buffer 104, with each frame retrievable using the corresponding frame index value.

Receive system 110 receives frames 10 and increments an internal frame index register 112 upon receipt of each frame. When a frame is improperly received, the receive samples are stored within improperly received frame buffer 114. Errors in received frames can be detected using a CRC checksum included in the frame.

When a frame is received with errors, receive system 110 sends a NACK message 12 back to the transmit system. The NACK message 12 includes a frame index 14 of the frame received with errors. Upon receipt of the NACK message 12 transmit system 100 retransmits the improperly received frame specified by the index value contained in the NACK message 12. In the example transmission shown, two NACK messages 12 are transmitted from receive system 110 and two retransmitted data frames 10 (in particular data frames 10.2 and 10.4, designated "R" for retransmit) are transmitted from transmit system 100 in response. The remaining frames 10 are designated "N" as newly transmitted.

In one embodiment of the invention, frames 10 do not include frame index values when transmitted to reduce the amount of data overhead necessary to conduct communications. In this embodiment, both transmit system 100 and receive system 110 maintain synchronized frame index registers 102 and 112. The synchronization is carried out by periodic transmission of synchronization data providing the state of the frame index register 102 at the transmit system. Various other methods for performing synchronization should be apparent, including basing the frame index on system time maintained precisely at both the transmit and receive systems.

Figure 2:
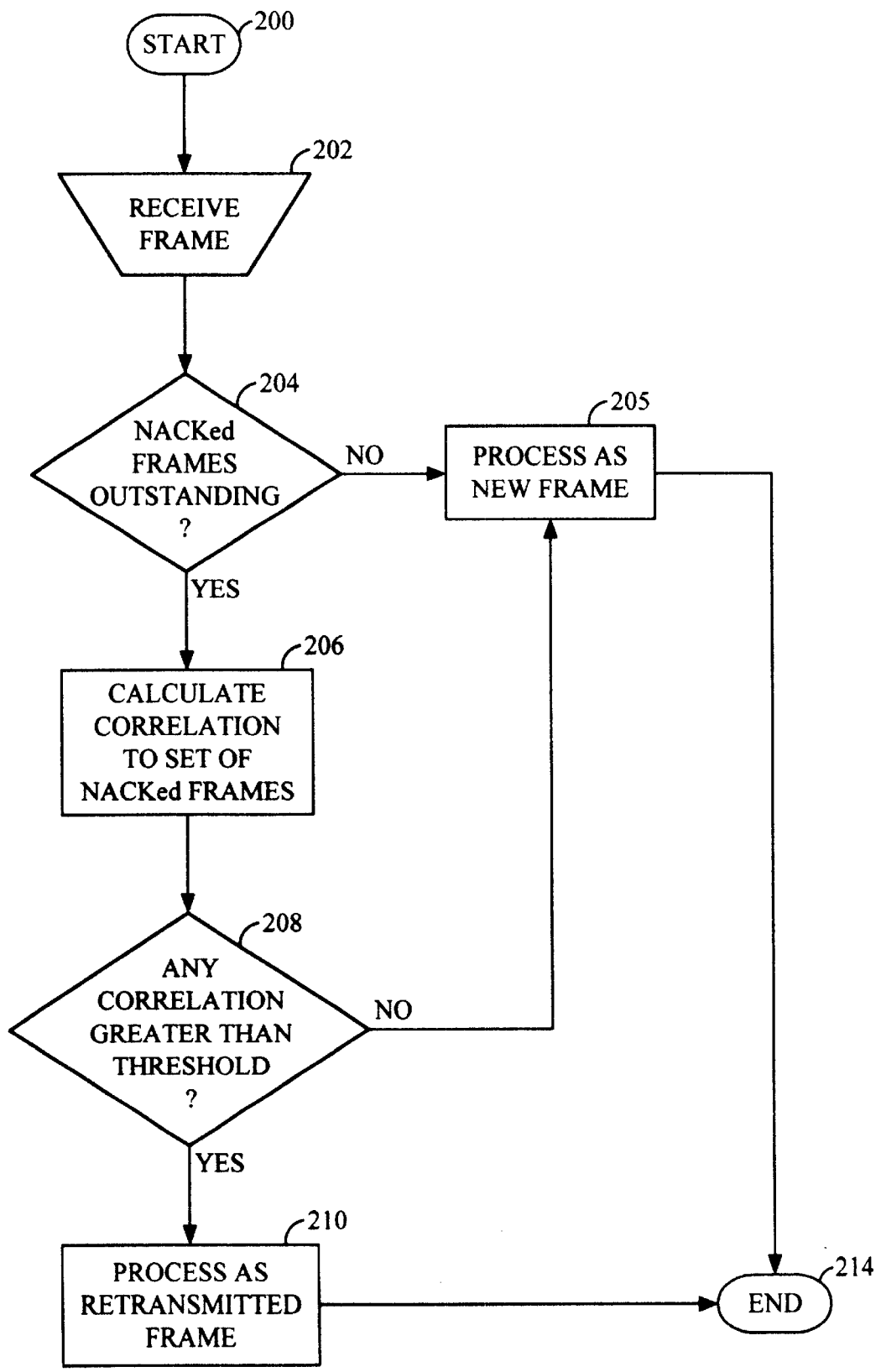
FIG. 2 is a is a flow chart illustrating the processing performed in an exemplary embodiment of the invention.

FIG. 2 is a flow chart illustrating the operation of receive system 110 (FIG. 1) when configured in accordance with one embodiment of the invention. Operation starts as step 200 and at step 202 a frame is received in the form of a set of estimations. At step 204, it is determined if any NACKed frames are outstanding. That is, it is determined if improperly received frames exist, for which retransmissions have yet to have been received. If not, the received frame is processed as a new frame and simply decoded.

If NACKed frames are outstanding, the receive system calculates a correlation between the estimates of the received frame and the estimates from the stored set of improperly received (and therefore NACKed) frames at step 206. As described above, in the exemplary embodiment the estimates for any improperly received frames are stored in frame buffer 114.

At step 208, it is determined if the correlation calculated for any set of estimates is more than a threshold value, and if not it is determined that the frame is a new frame and it is processed as a new frame at step 205.

If the maximum of the set of correlations calculated is more than a particular threshold, the receive frame is processed as a retransmitted frame at step 210. In one embodiment of the invention, processing as a retransmitted frame includes combining the two sets of estimates—the original set of estimates and the retransmitted set of estimates—and decoding the combined set of estimates. Processing of the frame then terminates at step 214.

By determining whether a frame is a new frame or a retransmitted frame by calculating the correlation between two sets of receive estimates, the need to include frame index values within each data frame is eliminated. Typically, the identity of each received frame must be determined using a frame index. The identity is used to determine whether the frame should be processed as a new frame or a retransmitted frame. Also, the identity determines the order in which to combine all the frames. Because calculating the correlation between frames provides an alternative, and highly accurate, method for determining frame identity, frame indexes may be omitted from frame and data overhead reduced.

In accordance with one embodiment of the invention, the correlation is between two frames is calculated as the cosine of the angle between the two vectors that characterize the frames in N dimensional space, where N is the number of bits or symbols within the frame used to perform the correlation calculation. For example, for a receive frame made up of a vector $\vec{R}$ of estimates and a stored frames made up of a vector $\vec{S}$ of estimates the correlation calculated as follows:

$$D = \cos(\varphi) = \frac{\vec{R} \cdot \vec{S}}{\|\vec{R}\|\|\vec{S}\|} \quad (1)$$

where $$\vec{R} \cdot \vec{S} = \sum_{i=1}^{N} R_i S_i, \quad (2)$$

$$\|\vec{R}\| = \sqrt{\sum_{i=1}^{N} R_i R_i} \quad (3)$$

and $$\|\vec{S}\| = \sqrt{\sum_{i=1}^{N} S_i S_i} \quad (4)$$

That is, the correlation D is equal to the dot product of the vector of estimates from the received frame and the stored frame, divided by the product of the Euclidean norm of the receive and stored frame estimate vectors. This embodiment of the invention is well suited for data that resembles a random binary sequence and where large frame sizes (e.g. 3000 bits or more) are used in the exemplary embodiment of the invention.

Figure 3:
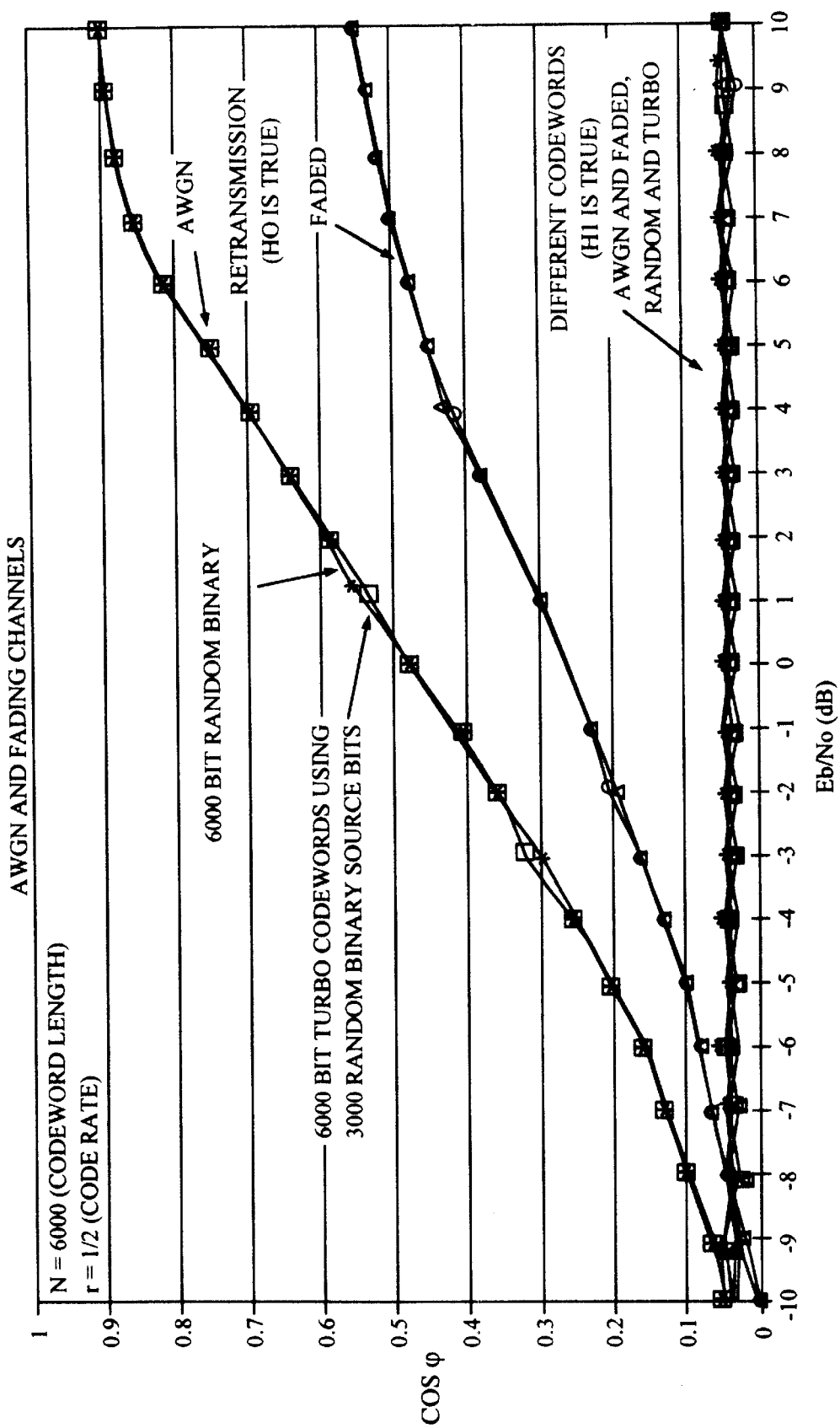
FIG. 3 is a block diagram of a receive system configured in accordance with one embodiment of the invention.

FIG. 3 illustrates that for frame sample sizes of 3000 bits and Eb/N0 above −7.5dB for an additive white Gaussian noise (AWGN) channel or −5dB for a fading channel, the threshold used in one embodiment of the invention to determine whether two frames have the same identity is D*=0.1. Thus, when D as calculated in equation (1) is greater than 0.1, the frames are matched, and when the correlation is less than 0.1, the frames are considered not matched. While the use of 0.1 is preferred, threshold values of between 0.07 and 0.15 provide reasonable performance.

Figure 4:
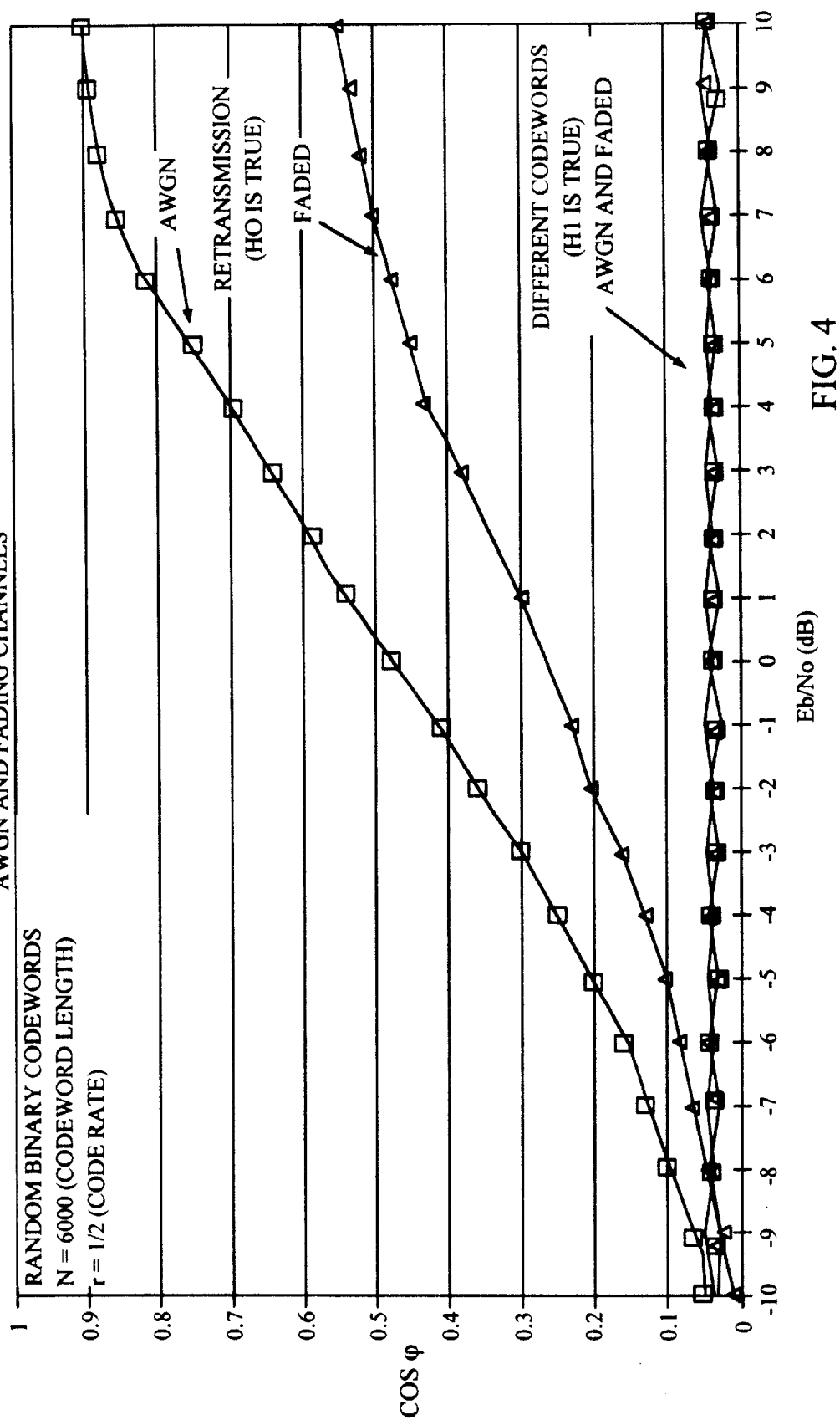
FIG. 4 is a graph illustrating certain aspects of the invention.

FIG. 4 illustrates that for larger frames or bit sample sizes of 20,000 bits, either the threshold or the operation signal to noise ratio can be lower. In this case, a threshold of 0.1 will provide correct decisions for all Eb/N0 above −8.5 dB (AWGN) or −6.0 dB (Fading).

Figure 5:
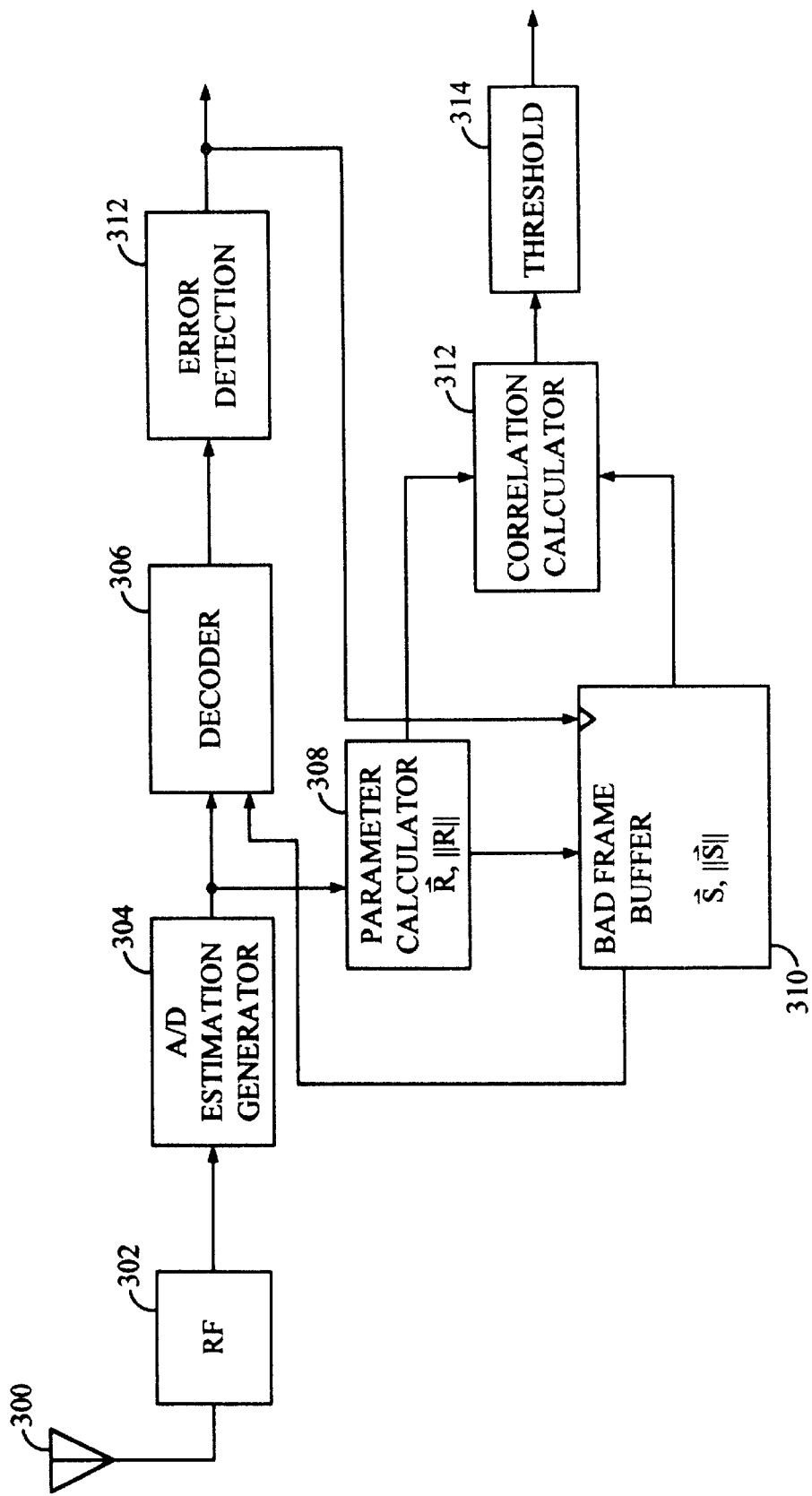
FIG. 5 is a graph illustrating other aspects of the invention.

FIG. 5 is a block diagram of a receive system configured in accordance with one embodiment of the invention. Radio frequency signals are received via antenna 300 and converted to baseband by RF unit 302. A/D estimate generator 304 generates digital samples, or estimates of the received data that are passed to decoder 306. Additionally, the receive estimates are passed to parameter calculator 308. If NACKed frames are pending, parameter calculator 308 calculates the normalized value of the received frame vector which is provided to correlation calculator 312. The precalculated normalized values of vectors stored in bad frame buffer 310 are also applied to correlation calculator 312 which calculates the correlation between the received and stored frames in accordance with equation (1) above. By storing the normalized values along with the vectors or frame estimates themselves, the number of operations performed for each correlation calculation is reduced.

The correlation calculations are forwarded to threshold 314 which determines if the correlation falls below the required threshold, and if so asserts a signal received by a control system (not shown). The control system is a microprocessor controlled by software instructions stored in memory in accordance with one embodiment of the invention.

If no match is detected the received frame is processed by decoder 306 as a new frame. The results of the decoding are providing to error detection device 312 which signals to the control system if errors are detected in the decoded frame. If an error is detected, and the frame is determined to be a new frame as described above, the frame and the corresponding normalized value are pushed into bad frame buffer 310. Additionally, a NACK is transmitted including a frame index value as described above.

If the correlation calculation performed by correlation calculator 312 indicate that the received frame does match a stored bad frame, and therefore is a retransmitted frame, the estimate vector for the frame stored in bad frame buffer 310 is supplied to decoder 306. Decoder 306 combines the received frame with the stored frame, and processes the resulting combined frame vector. If this decode fails, replace stored frame with the combined frame in the frame buffer.

Thus, a blind frame identification technique for a retransmission communication is described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for processing a received frame of data comprising the steps of
    a) generating estimates of the received frame;
    b) measuring a correlation between said estimates and stored estimates of a previously improperly received frame;
    c) processing the received frame as a new frame when said correlation is less than a first threshold;

d) processing the received frame as a retransmitted frame when said correlation is greater than a second threshold, wherein said second threshold is greater than or equal to said first threshold.

2. The method as set forth in claim 1 wherein the estimates and the stored estimates contain N estimate values, and step b) is comprised of the steps of calculating the cosine of an angle between the estimates and the stored estimates in N dimensions.

3. The method as set forth in claim 1, wherein said estimates are represented by a vector R and said stored estimates are represented by a vector S, and wherein step b) is performed by using the equation:

$$D = \cos(\varphi) = \frac{\vec{R} \cdot \vec{S}}{\|\vec{R}\| \|\vec{S}\|}.$$

4. The method as set forth in claim 1 wherein said threshold is approximately equal to 0.1.

5. The method as set forth in claim 1 wherein said threshold is between 0.07 and 0.15.

6. The method as set forth in claim 1, wherein said estimates are represented by a vector R and said stored estimates are represented by a vector S, and wherein step b) is performed by using the equation:

$$D = \cos(\varphi) = \frac{\vec{R} \cdot \vec{S}}{\|\vec{R}\| \|\vec{S}\|}$$

where $$\vec{R} \cdot \vec{S} = \sum_{i=1}^{N} R_i S_i,$$

$$\|\vec{R}\| = \sqrt{\sum_{i=1}^{N} R_i R_i}$$

and $$\|\vec{S}\| = \sqrt{\sum_{i=1}^{N} S_i S_i}.$$

7. A system for transmitting data comprising:

transmit system for transmitting non-indexed frames and for retransmitting NACKed frames;

receive system for calculating a correlation between a received frame and stored received frames, and for processing said received frame as new frames when said correlation is below a threshold and for processing said received frame as a retransmitted frame when said correlation is above said threshold.

8. The system as set forth in claim 7 wherein said receive system is comprised of:

frame index counter for maintaining an index number of received frames;

error detection system for detecting a frame received with errors; and

NACK message generator for generating a NACK message when an error is detected, wherein said NACK message contains the index number of the frame received with errors.

9. The system as set forth in claim 7 wherein the received frame and the stored frame contain N estimate values, and said receive system is further for calculating the cosine of an angle between the received frame and the stored frame in N dimensions.

10. The system as set forth in claim 9 wherein said threshold is approximately equal to 0.1.

11. The system as set forth in claim 9 wherein said threshold is between 0.07 and 0.15.

\* \* \* \* \*